(12) United States Patent
Chen

(10) Patent No.: US 7,873,842 B2
(45) Date of Patent: Jan. 18, 2011

(54) POWER SUPPLIER WITH COMBINABLE POWER OUTPUT PORTS

(75) Inventor: Michael Chen, Taipei Hsien (TW)

(73) Assignee: Topower Computer Industrial Co., Ltd., Taipei Hsien (TW)

( * ) Notice: Subject to any disclaimer, the term of this patent is extended or adjusted under 35 U.S.C. 154(b) by 726 days.

(21) Appl. No.: 11/603,176

(22) Filed: Nov. 22, 2006

(65) Prior Publication Data

US 2008/0116749 A1    May 22, 2008

(51) Int. Cl.
| G06F 1/00 | (2006.01) |
| H01R 29/00 | (2006.01) |
| H01R 11/00 | (2006.01) |
| H01R 13/514 | (2006.01) |

(52) U.S. Cl. .................. 713/300; 439/188; 439/502; 439/701

(58) Field of Classification Search .................. 713/300; 439/188, 502, 701
See application file for complete search history.

(56) References Cited

U.S. PATENT DOCUMENTS

| 6,129,598 | A  | * | 10/2000 | Yu et al. | ............ | 439/883 |
| 6,314,001 | B1 | * | 11/2001 | Chu | ............ | 361/826 |
| 6,935,902 | B1 | * | 8/2005 | Chou | ............ | 439/701 |
| 7,187,544 | B2 | * | 3/2007 | Tsai | ............ | 307/43 |
| 7,442,076 | B2 | * | 10/2008 | Huang | ............ | 439/502 |
| 2004/0150267 | A1 | * | 8/2004 | Ferguson | ............ | 307/70 |
| 2005/0141698 | A1 | * | 6/2005 | Karam | ............ | 379/413 |
| 2005/0237724 | A1 | * | 10/2005 | Fiorentino et al. | ............ | 361/752 |
| 2006/0262492 | A1 | * | 11/2006 | Tsai | ............ | 361/601 |
| 2007/0099451 | A1 | * | 5/2007 | Chou et al. | ............ | 439/79 |
| 2007/0128945 | A1 | * | 6/2007 | Huang | ............ | 439/638 |

OTHER PUBLICATIONS

Mark Allen, PlayTool "All about the various PC power supply cables and connectors" Aug. 18, 2006.*
Jon Gerow, "Power supplies 101: A comprehensive guide :: Motherboards" Jun. 26, 2006.*

* cited by examiner

*Primary Examiner*—Thomas Lee
*Assistant Examiner*—Vincent T Tran
(74) *Attorney, Agent, or Firm*—Muncy, Geissler, Olds & Lowe, PLLC

(57) ABSTRACT

A power supplier with combinable power output ports includes plural power output ports which include at least a unit output port, wherein the unit output port has two terminal slots in which two power terminals at different potentials are respectively mounted, and the unit output port can be combined with another power output port to form a combined output port having another voltage output. The power supplier of the present invention, according to the demands of the user, provides different voltage output standards or sets through combining the unit output port with another unit output port or combining the unit output port with the base level output port to transform into the needed voltage output.

16 Claims, 8 Drawing Sheets

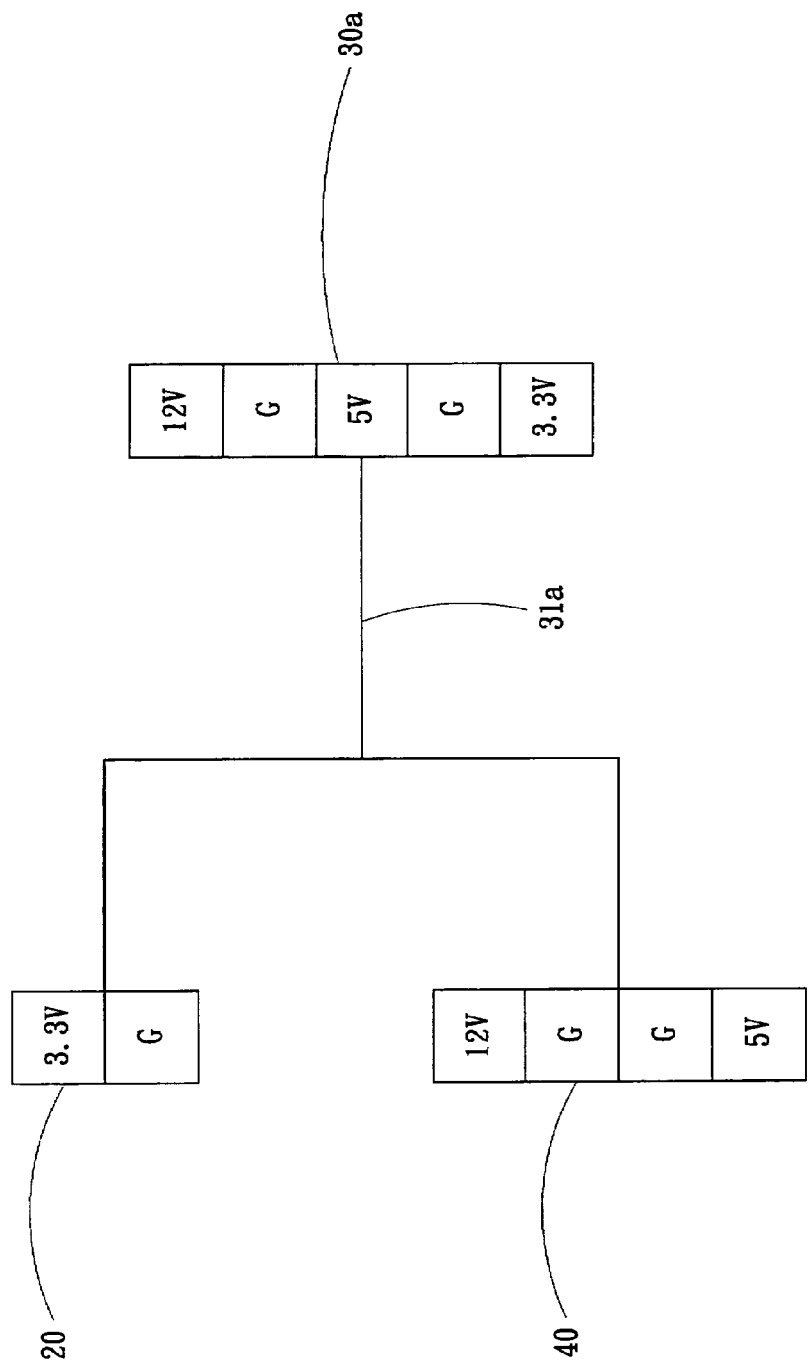

POWER SUPPLIER WITH COMBINABLE POWER OUTPUT PORTS

FIELD OF THE INVENTION

The present invention is related to a power supplier, and more particularly to a power supplier having combinable power output ports.

BACKGROUND OF THE INVENTION

Because of the development of computer technology, more and more standards for electronic products are developed, and the new generation electronic devices, such as, dual core CPU, display card, etc., always need the power output port having more pins. For the general power supplier providing power to CPU, the power output port used for the single core CPU needs four pins, nut the dual core CPU needs the power output port having eight pins. Furthermore, the display card under PCI Express standard employs the power supplier with six pins power output port, but the display card under dual PCI Express standard needs the power output port having eight pins for power supplying.

As illustrated above, every time the new voltage standard for the electronic product is drawn up, the new challenge for the manufacturer of power supplier is emerged. The manufacturer has to follow the new standard, re-design and fabricate a suitable and workable new power supplier so as to conform to the new output port demand of the new electronic product. Moreover, once the power supplier is re-designed, it has to further pass through the safety examination for sale, and the expense spent on examination has gradually become a burden for the manufacturer.

Furthermore, since the amount of the power output ports provided by the general power suppliers is identical, for example, in SATA standard, usually, the provided amount of power output ports is eight sets for slotting the compatible hard disks, the limitation is also emerged that the hard disk installation inside the computer is restricted to be less than eight, which is quite inconvenient for some users. Therefore, for conforming to the new voltage standard (even the uncertain voltage standard) used by the new product, there is a need to design a power supplier whose voltage output can be transformed into another standard through combining the output ports thereof, and through further combining the idle output ports, still another voltage output can be transformed for the user (such as the described SATA output port), so that the power supplier can adequately correspond to the new voltage standard for preventing a frequent replacement, and the user also can acquire the flexibility in computer application.

SUMMARY OF THE INVENTION

The object of the present invention is to provide a power supplier having plural output ports, which can combined mutually to become a given voltage output or a voltage output under a new standard.

Another object of the present invention is to provide a power supplier whose unit output port and base level output port can be combined together to form a combined output port for, except the voltage outputs provided by the original base level output port, providing a voltage output conforming to the new power standard of electronic device.

The power supplier of the present invention, according to the demands of the user, provides different voltage output standards or sets through combining the unit output port with another unit output port or combining the unit output port with the base level output port to transform into the needed voltage output so as to correspond to the new power standard and improve the flexibility of power output.

For achieving the objects described above, in the embodiments of the present invention, the power supplier includes plural power output ports which include at least a unit output port, wherein the unit output port has two terminal slots in which two power terminals at different potentials are respectively mounted, and the unit output port can be combined with another power output port to form a combined output port having another voltage output.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein:

FIGS. 2A~2B are a structural drawing and a schematic view of potentials at output ports in a second preferred embodiment according to the present invention;

DESCRIPTION OF THE PREFERRED EMBODIMENT

Figure 1A:
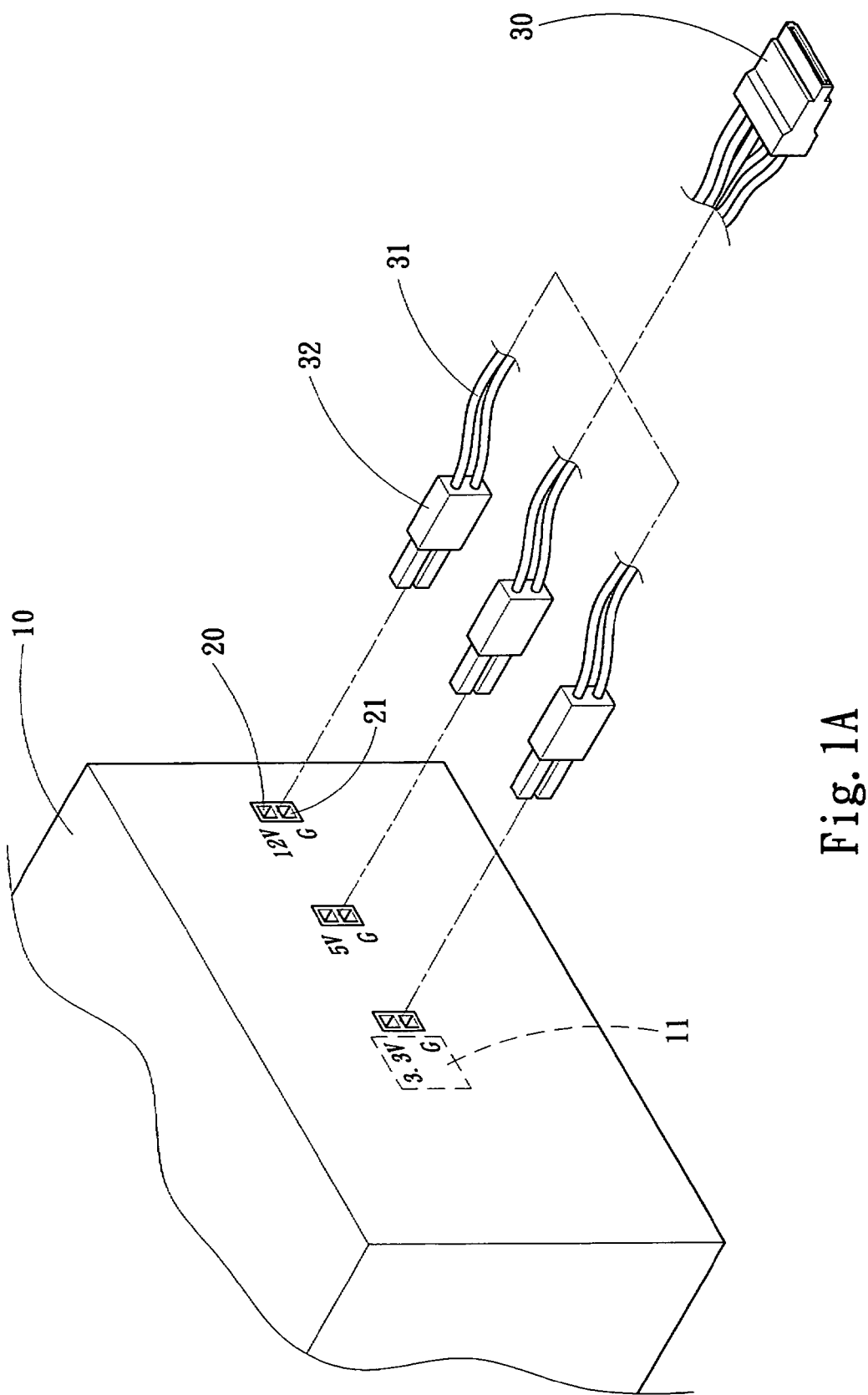
FIGS. 1A~1B are a structural drawing and a schematic view of potentials at output ports in a preferred embodiment according to the present invention.
Figure 1B:
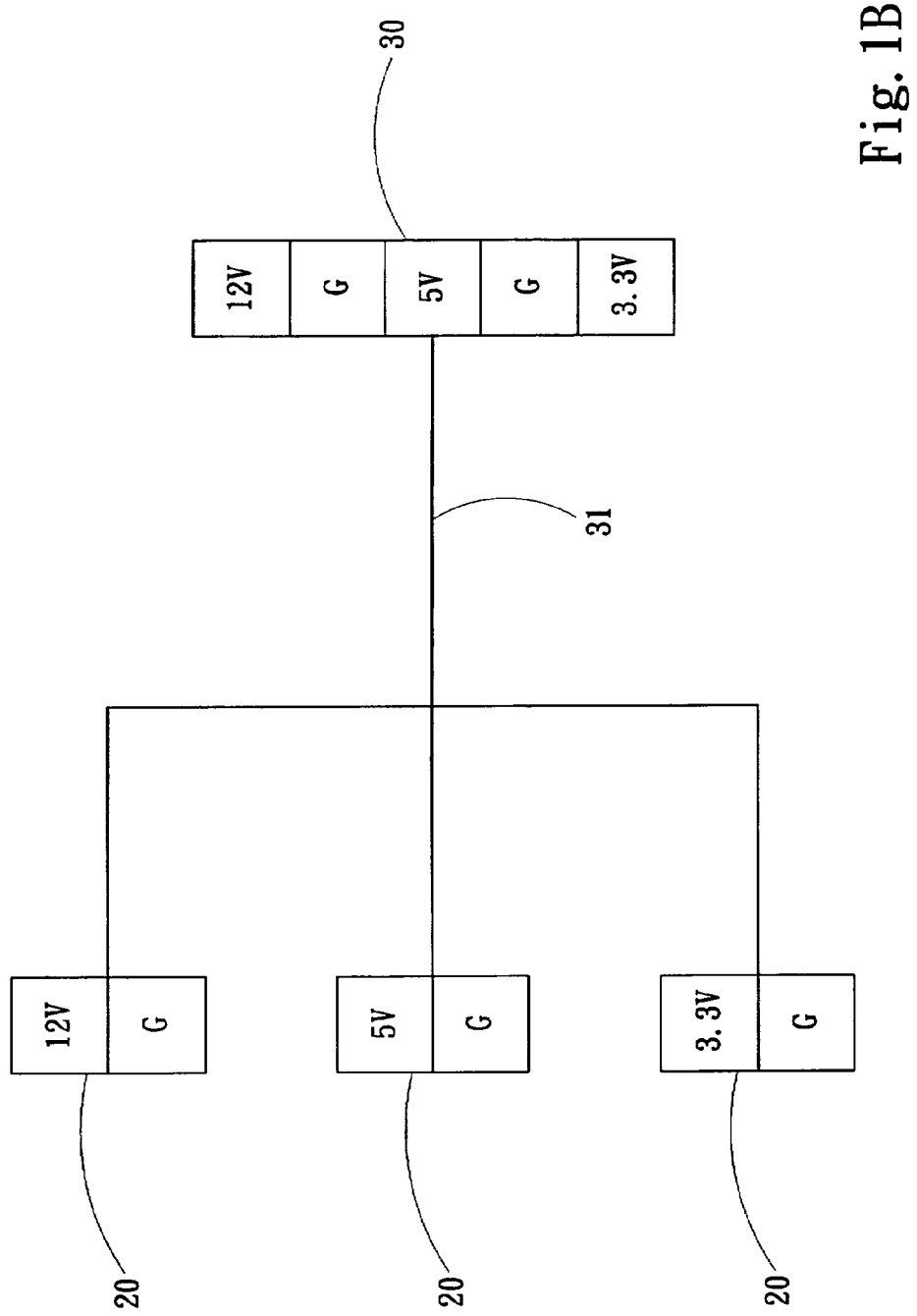

Please refer to FIGS. 1A~1B, which respectively show a structural drawing and a schematic view of the potentials in a preferred embodiment according to the present invention. As shown, the present invention is related to a power supplier having combinable power output ports. Generally, the main body 10 of the power supplier has plural power output ports and each power output port has a voltage output, which is combined by different potentials, such as 12V, 5V, 3.3V, G . . . etc. The power output port further includes at least a unit output port 20, and the main body 10 has marker 11 at the position corresponding to the unit output port 20 for indicating the potential for identification. The unit output port 20 has two terminal slots 21 which respectively have power terminals at different potentials. In this embodiment, the three unit output ports 20 respectively have potentials of "12V, G", "5V, G", and "3.3V, G", and a SATA-form combined output port 30 is respectively connected to the three unit output ports 20 through transmission lines 31 and the connecting sockets 32 thereon such that the unit output port 20 and other unit output ports 20 can have a SATA voltage output (12V, G, 5V, G, 3.3V) through combining the potentials of "12V, G", "5V, G", and "3.3V, G", wherein the power terminals of the unit output port 20 can be respectively a live wire power terminal and a ground wire power terminal, or a live wire power terminal with relatively higher potential and a ground wire power terminal with relatively lower potential. Both are described below.

Figure 2A:
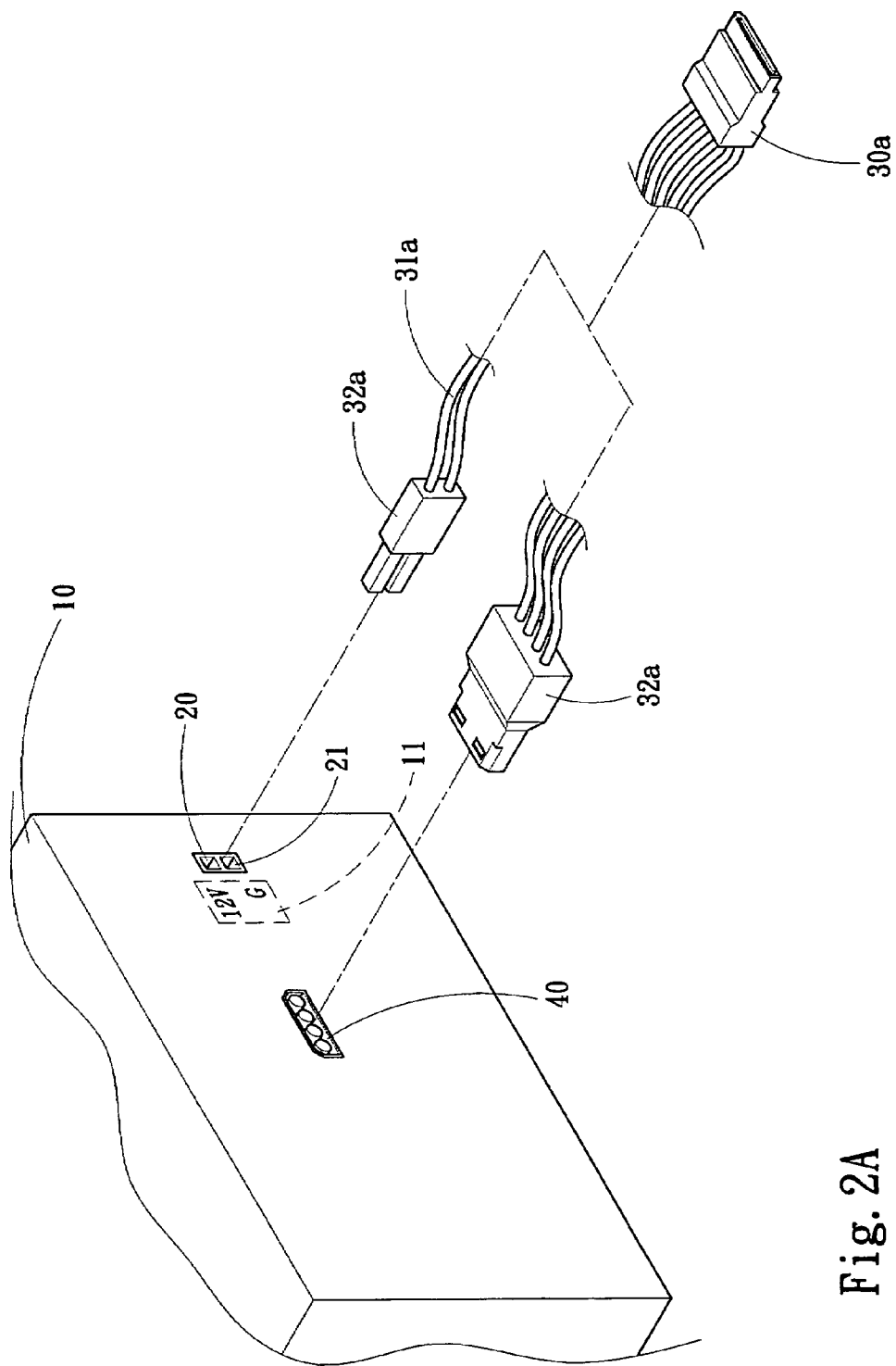

Please refer to FIGS. 2A~2B, which respectively show a structural drawing and a schematic view of the potentials in a preferred embodiment according to the present invention. As shown, in this embodiment, the power supplier further includes a base level output port 40, which can be SATA standard, PCI Express standard, 4P (Peripheral Power Connector) standard, a 20 pins standard for supplying power to motherboard, or a 4 pins standard for supplying power to CPU, and the combined output port 30 is constituted by the base level output port 40 with the unit output port 20. In this embodiment, the base level output port 40 adopts the 4P standard and has the potentials of 12V, G, G, and 5V, and the combined output port 30a adopts STA standard. Through the potentials 3.3V and G provided by the unit output port 20, the base level output port 40 can be combined with the unit output port 20 to output potentials of 12V, G, 5V, G, and 3.3V which are needed in SATA standard. The transformation method is the combined output port 30a can have a transmission line 31a and a connecting socket 32a for connecting to the base level output port 40 and the unit output port 20, thereby the idle base level output port 40 can be transformed into another voltage output needed by the user (such as the described SATA standard) through combining with the unit output port 20.

Figure 3:
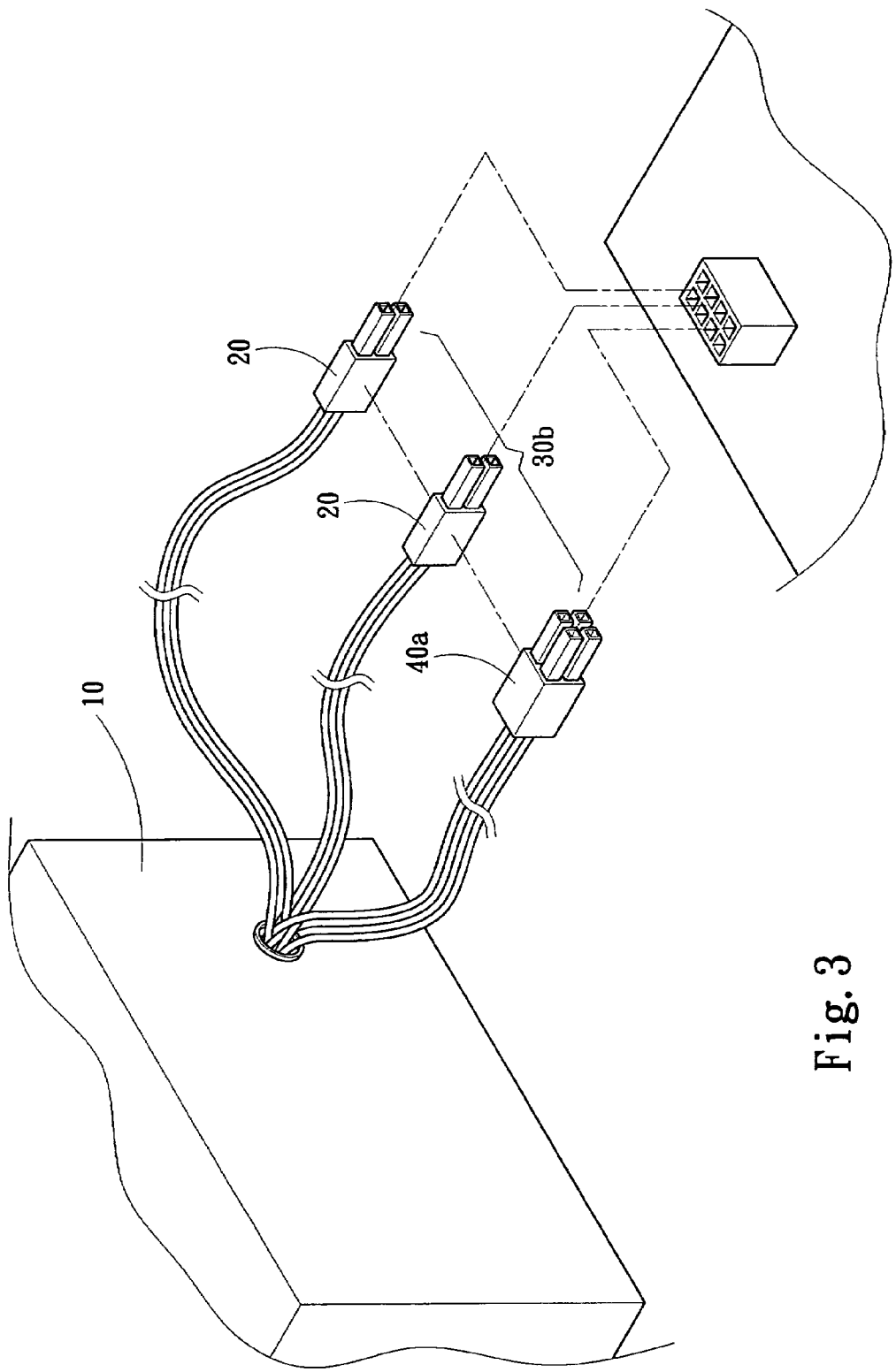
FIG. 3 is a structural drawing showing a third embodiment of the present invention.

Please refer to FIG. 3 which shows a structural drawing of a third embodiment according to the present invention. As shown, in this embodiment, the base level output port 40a is a 4 pins output port for supplying power to the signal core CPU. Currently, the power needed by the dual core CPU is provided by the 8 pins power output port, and through combining the base level output port 40a and two unit output ports 20, the combined output port 30b becomes an 8 pins power output port conforming to the demand of dual CPU. Furthermore, in this embodiment, the unit power output port 20 and the base level output port 40a are direct wired from the main body 10 of the power supplier.

Figure 4A:
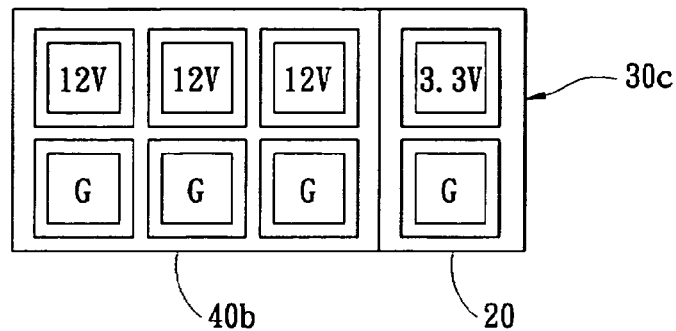
FIGS. 4A~4C are schematic views showing potentials in a fourth embodiment according to the present invention.
Figure 4B:
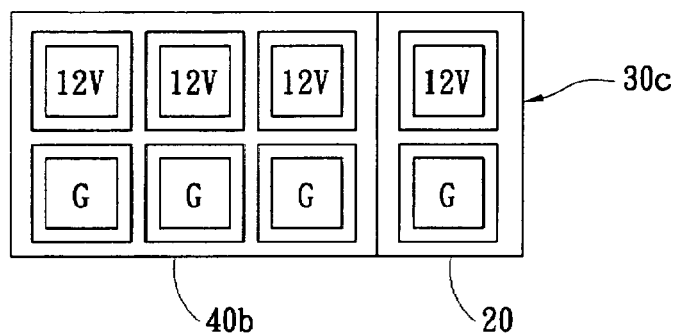
Figure 4C:
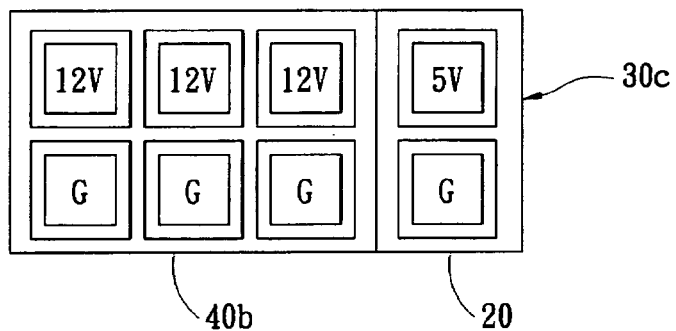

Please refer to FIGS. 4A~4C which show schematic views of potentials in a fourth embodiment according to the present invention. As shown, for the PCI Express standard of display card, the number of pins should be six, but corresponding to the new power standard, it might become eight, and actually, the potentials for the additional 2 pins are still uncertain. In this embodiment, the base level output port 40b is a PCI Express standard output port, and through combining with the unit output port 20, no matter the potentials for the additional 2 pins are "12V, G", "5V, G", "3.3V, G" or two live wires with high and low potentials, the user can find a unit output port 20 corresponding to the potential from plural ones to combine with the base level output port 40b so as to become a combined output port 30c, which conforms to the new standard.

Figure 5A:
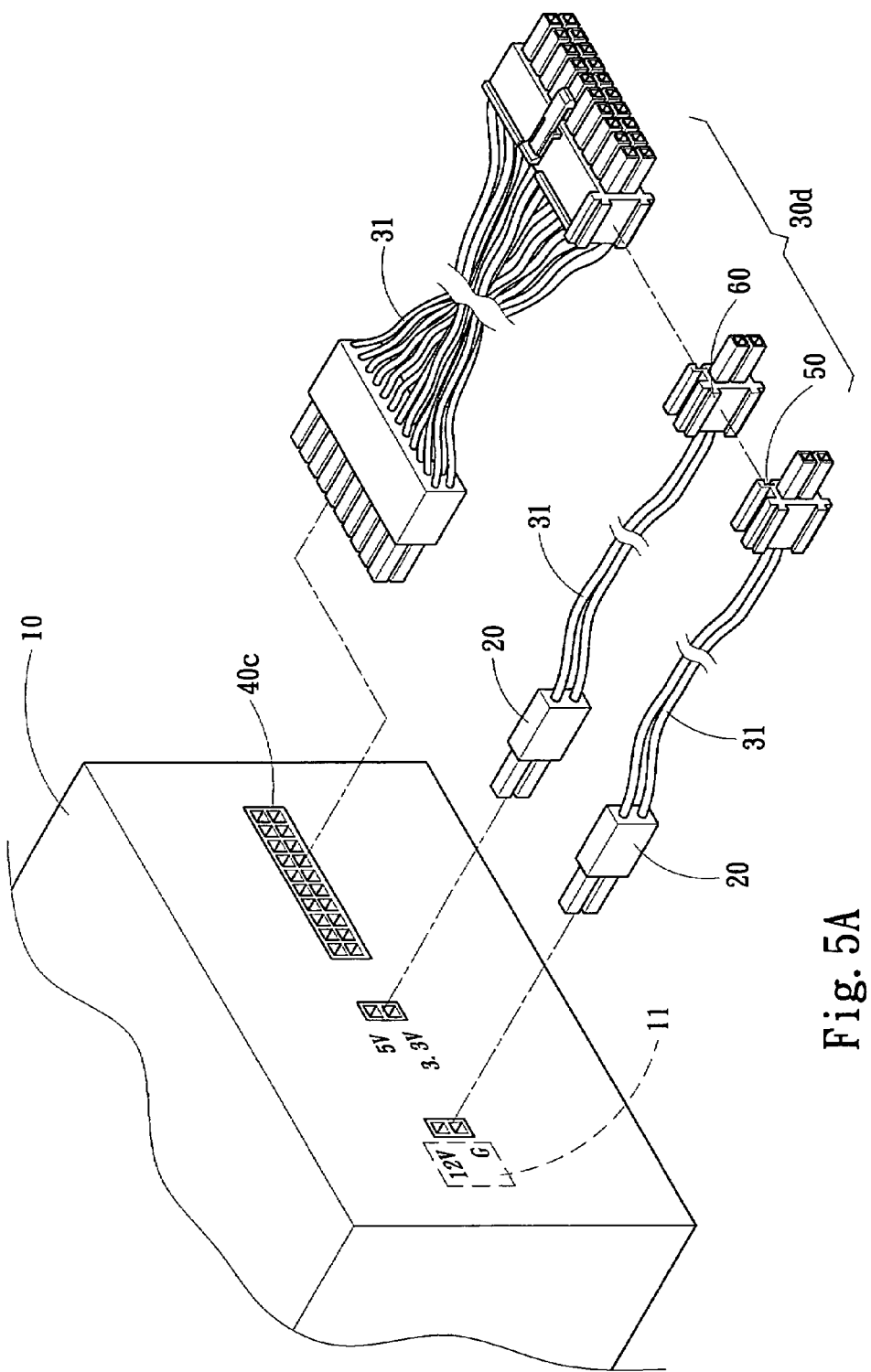
FIGS. 5A~5B are a structural drawing and a schematic view of potentials at output ports in a fifth preferred embodiment according to the present invention.
Figure 5B:
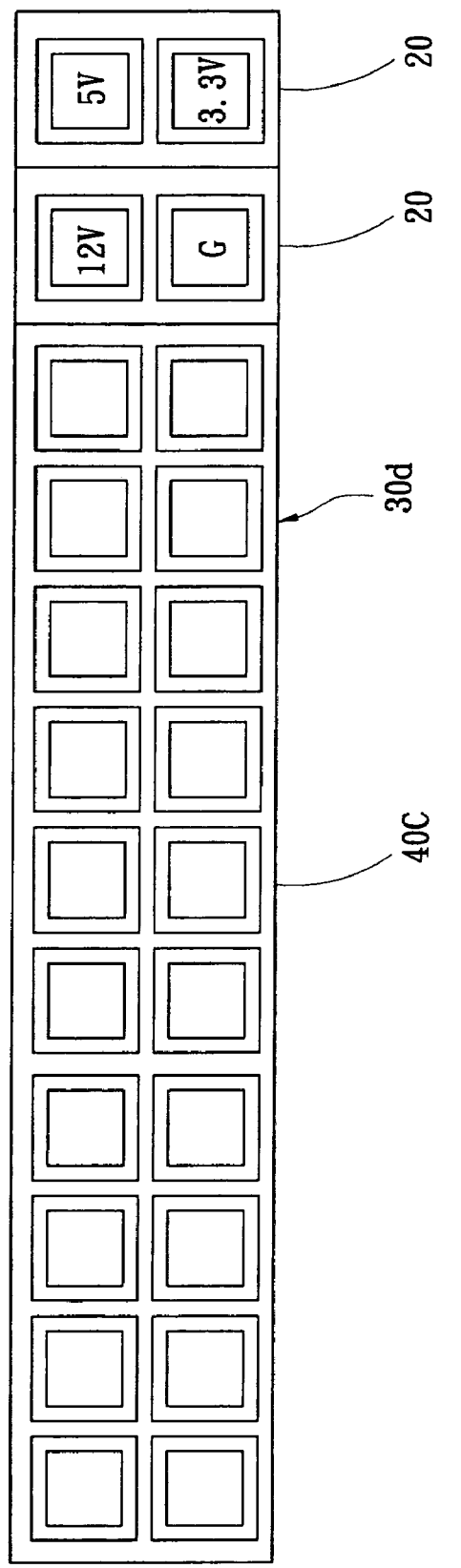

Please refer to FIGS. 5A~5B which respectively show a structural drawing and a schematic view of potentials in a fifth embodiment according to the present invention. As shown, on the main body 10 of the current power supplier, the power output ports for supplying power to the motherboard can be divided into 20 pins and 24 pins, and in this embodiment, the base level output port 40c is the 20 pins power output port, so that as combining the base level output port 40c with two unit output ports 20 respectively having the potentials of "12V, G" and "5V, 3.3 V", a combined output port 30d conforming to the 24 pins demand can be acquired. In all the embodiments described above, the unit output port 20 can be assembled with other unit output port 20 or the base level output port 40 through a connecting manner, for example, the unit output port 20 and the power output port can respectively be set thereon an assembling slot 50 and a fixing portion 60, which are mutually matched.

The present invention conforms to different demands from different users, wherein through the combination between the unit output port 20 and other unit output port 20 or between the unit output port 20 and the base level output port 40, a needed voltage output can be transformed for providing different voltage output standards and sets so as to correspond to constantly varied power standard and improve the output flexibility of the power supplier.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supplier with combinable power output ports, comprising:
   a main body of the power supplier;
   plural power output ports mounted on the main body, each power output port having plural power terminals and the plural power output ports further comprising at least a unit output port, which has two terminal slots with two power terminals at different potentials respectively mounted therein, said power output ports and said unit output port each having different voltage values; and
   plural transmission lines electrically connected to the power output ports and the unit output port, each transmission line includes a connecting socket on one end corresponding and coupling to the unit output port, and the unit output port and other power output ports are electrically combined to form a combined output port through the transmission lines on the other end, the combined output port having fewer ports than a combination of said unit output port and said power output ports, so as to supply power to a single device, wherein the unit output port and the combined output port have different pin arrangements.

2. The power supplier with combinable power output ports as claimed in claim 1, wherein the power terminals of the unit output port are respectively a live wire power terminal and a ground wire power terminal.

3. The power supplier with combinable power output ports as claimed in claim 1, wherein the power terminals of the unit output port are respectively a live wire power terminal at a first potential and a ground wire power terminal at a second potential which is lower than the first potential.

4. The power supplier with combinable power output ports as claimed in claim 1, wherein the combined output port has a voltage output suitable for the SATA power standard.

5. The power supplier with combinable power output ports as claimed in claim 1, wherein the combined output port has a voltage output suitable for the power standard of the motherboard.

6. The power supplier with combinable power output ports as claimed in claim 1, wherein the combined output port has a voltage output suitable for the power standard of CPU.

7. The power supplier with combinable power output ports as claimed in claim 1, wherein the combined output port has a voltage output suitable for the power standard of display card.

8. The power supplier with combinable power output ports as claimed in claim 1, wherein the main body of the power supplier has a marker for indicating the position corresponding to the unit output port for identification.

9. The power supplier with combinable power output ports as claimed in claim 1, wherein the plural power output ports further comprise a base level port and the combined output port is formed by combining one unit output port with the base level output port.

10. The power supplier with combinable power output ports as claimed in claim 9, wherein the base level output port is a SATA standard output port.

11. The power supplier with combinable power output ports as claimed in claim 9, wherein the base level output port is 20 pins output port for supplying power to a motherboard.

12. The power supplier with combinable power output ports as claimed in claim 9, wherein the base level output port is 4 pins output port for supplying power to CPU.

13. The power supplier with combinable power output ports as claimed in claim 9, wherein the base level output port is a PCI Express standard output port.

14. The power supplier with combinable power output ports as claimed in claim 9, wherein the base level output port is a 4P (Peripheral Power Connector) standard output port.

15. The power supplier with combinable power output ports as claimed in claim 1, wherein the unit output port is assembled with other power output port through a connecting manner.

16. The power supplier with combinable power output ports as claimed in claim 15, wherein the connecting manner comprises: mounting an assembling slot and a fixing portion, which are mutually matched, respectively on the unit output port and the power output port.

* * * * *